US009536229B2

(12) United States Patent
Bhide et al.

(10) Patent No.: US 9,536,229 B2
(45) Date of Patent: ***Jan. 3, 2017

(54) OUT-OF-OFFICE NOTIFICATION MECHANISM FOR EMAIL CLIENTS

(71) Applicant: International Business Machines Corporation, Armonk, NY (US)

(72) Inventors: Manish A. Bhide, Hyderabad (IN); Nithinkrishna Shenoy, Mangalore (IN)

(73) Assignee: International Business Machines Corporation, Armonk, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/677,440

(22) Filed: Apr. 2, 2015

(65) Prior Publication Data

US 2016/0055456 A1 Feb. 25, 2016

Related U.S. Application Data

(63) Continuation of application No. 14/463,983, filed on Aug. 20, 2014.

(51) Int. Cl.
*H04L 12/58* (2006.01)
*G06Q 10/10* (2012.01)
(Continued)

(52) U.S. Cl.
CPC ............. *G06Q 10/107* (2013.01); *H04L 43/04* (2013.01); *H04L 51/02* (2013.01); *H04L 51/14* (2013.01);
(Continued)

(58) Field of Classification Search
None
See application file for complete search history.

(56) References Cited

U.S. PATENT DOCUMENTS 7,386,595 B1 * 6/2008 Bloomer, Jr. ........ G06Q 10/107 709/203
7,406,504 B2 * 7/2008 Paul ...................... G06Q 10/107 709/206

(Continued)

FOREIGN PATENT DOCUMENTS

| CA | 2793997 A1 | 1/2013 |
|---|---|---|
| EP | 2363984 A2 | 9/2011 |

OTHER PUBLICATIONS

IBM, "List of IBM Patents or Patent Applications Treated as Related (Appendix P)," Apr. 3, 2015.
(Continued)

*Primary Examiner* — Ranodhi Serrao
*Assistant Examiner* — James Fiorillo
(74) *Attorney, Agent, or Firm* — Patricia B. Feighan

(57) ABSTRACT

A method for an out-of-office message notification system to notify at least one sender who has sent an email in a pre-defined time span prior to a start time associated with an out-of-office notification being set by a user is provided. The method may include identifying an unresponded email within a plurality of unresponded emails in an inbox received within the pre-defined time span prior to the start time associated with the out-of-office notification being set by a user. The method may also include sending an out-of-office message notification to the sender associated with the unresponded email.

8 Claims, 3 Drawing Sheets

(51) Int. Cl.
*H04L 12/26* (2006.01)
*G06N 5/04* (2006.01)
*G06F 17/30* (2006.01)

(52) U.S. Cl.
CPC ............... *H04L 51/22* (2013.01); *H04L 51/24* (2013.01); *H04L 51/36* (2013.01); *G06F 17/30864* (2013.01); *G06N 5/047* (2013.01); *G06Q 10/109* (2013.01); *G06Q 10/1095* (2013.01)

(56) References Cited

U.S. PATENT DOCUMENTS

| | | | | |
|---|---|---|---|---|
| 8,230,030 | B2* | 7/2012 | Cummings | G06F 15/16 709/204 |
| 8,886,732 | B2* | 11/2014 | Avitabile | G06Q 10/10 709/206 |
| 2004/0054732 | A1* | 3/2004 | Carter | G06Q 10/107 709/206 |
| 2006/0031326 | A1* | 2/2006 | Ovenden | G06Q 10/109 709/206 |
| 2007/0192419 | A1* | 8/2007 | Vuong | G06Q 10/107 709/206 |
| 2008/0040177 | A1* | 2/2008 | Vuong | G06Q 10/00 709/206 |
| 2008/0104175 | A1* | 5/2008 | Keohane | G06Q 10/107 709/206 |
| 2008/0104177 | A1* | 5/2008 | Keohane | G06Q 10/107 709/206 |
| 2008/0155023 | A1* | 6/2008 | Kadashevich | G06F 11/1482 709/206 |
| 2009/0037359 | A1* | 2/2009 | Callanan | G06Q 10/107 706/47 |
| 2009/0228806 | A1* | 9/2009 | Kadashevich | G06Q 10/1093 715/747 |
| 2010/0088381 | A1* | 4/2010 | Deslandres | H04L 12/585 709/206 |
| 2010/0146059 | A1* | 6/2010 | DellaFera | G06Q 10/107 709/206 |
| 2010/0318615 | A1* | 12/2010 | Griffin | G06Q 10/107 709/206 |
| 2011/0010218 | A1* | 1/2011 | Gupta | G06Q 10/10 705/7.18 |
| 2011/0191424 | A1* | 8/2011 | Cumming | G06F 15/16 709/206 |
| 2013/0031184 | A1* | 1/2013 | Avitabile | G06Q 10/109 709/206 |
| 2013/0067000 | A1* | 3/2013 | Brauninger | G06Q 10/109 709/206 |
| 2013/0254299 | A1* | 9/2013 | Burshtein | G06Q 10/107 709/206 |
| 2014/0082098 | A1* | 3/2014 | Collins | G06Q 10/109 709/206 |
| 2014/0129648 | A1* | 5/2014 | Bos | G06Q 10/107 709/206 |
| 2014/0280616 | A1* | 9/2014 | Ramanathan | H04L 51/22 709/206 |
| 2014/0379825 | A1* | 12/2014 | Speier | H04L 51/24 709/206 |
| 2015/0142897 | A1* | 5/2015 | Alten | H04L 51/36 709/206 |
| 2015/0235178 | A1* | 8/2015 | Brauninger | G06Q 10/1095 705/7.19 |
| 2015/0324424 | A1* | 11/2015 | Bhide | G06F 17/30864 707/769 |
| 2015/0381533 | A1* | 12/2015 | Klemm | H04L 51/02 709/206 |

OTHER PUBLICATIONS

Bhide et al., "Out-of-Office Notification Mechanism for Email Clients," Filed on Aug. 20, 2014, p. 1-24, U.S. Appl. No. 14/463,983.
Anonymous, "Advance notification system with Out of Office Manager," IP.com, Feb. 26, 2014, p. 1-2, IPCOM000235055D.
IBM, "Proactive Out-of-the-office E-mail Manager," IP.com, May 5, 2004, p. 1-2, IPCOM000028233D.
IBM, "Setting up out-of-office notifications," IBM Knowledge Center, p. 1-2, Lotus Notes, http://www-01.ibm.com/support/knowledgecenter/SSKTWP_8.0.1/com.ibm.notes.help.doc/DOC/H_Notifying_PEOPLE_AUTOMATICALLY_WHEN_YOU_ARE_OUT_OF_THE_OFFICE.html?lang=en, Accessed on Jun. 4, 2014.

* cited by examiner

OUT-OF-OFFICE NOTIFICATION MECHANISM FOR EMAIL CLIENTS

FIELD OF THE INVENTION

The present invention relates generally to the field of computing, and more particularly to email clients.

BACKGROUND

An out-of-office notification service may be used to send an automated reply to incoming messages while a user is away. As such, the automated reply may tell people who send a user mail while the user is away that the user is out and may additionally inform them as to when the user will be returning.

SUMMARY

According to one embodiment, a method for an out-of-office message notification system to notify at least one sender who has sent an email in a pre-defined time span prior to a start time associated with an out-of-office notification being set by a user is provided. The method may include identifying an unresponded email within a plurality of unresponded emails in an inbox received within the pre-defined time span prior to the start time associated with the out-of-office notification being set by a user. The method may also include sending an out-of-office message notification to the sender associated with the unresponded email.

According to another embodiment, a computer system for an out-of-office message notification system to notify at least one sender who has sent an email in a pre-defined time span prior to a start time associated with an out-of-office notification being set by a user is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include identifying an unresponded email within a plurality of unresponded emails in an inbox received within the pre-defined time span prior to the start time associated with the out-of-office notification being set by a user. The method may also include sending an out-of-office message notification to the sender associated with the unresponded email.

According to yet another embodiment, a computer program product for an out-of-office message notification system to notify at least one sender who has sent an email in a pre-defined time span prior to a start time associated with an out-of-office notification being set by a user is provided. The computer program product may include one or more computer-readable tangible storage medium and program instructions stored on at least one of the one or more tangible storage medium, the program instructions executable by a processor. The computer program product may include program instructions to identify an unresponded email within a plurality of unresponded emails in an inbox received within the pre-defined time span prior to the start time associated with the out-of-office notification being set by a user. The computer program product may also include program instructions to send an out-of-office message notification to the sender associated with the unresponded email.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
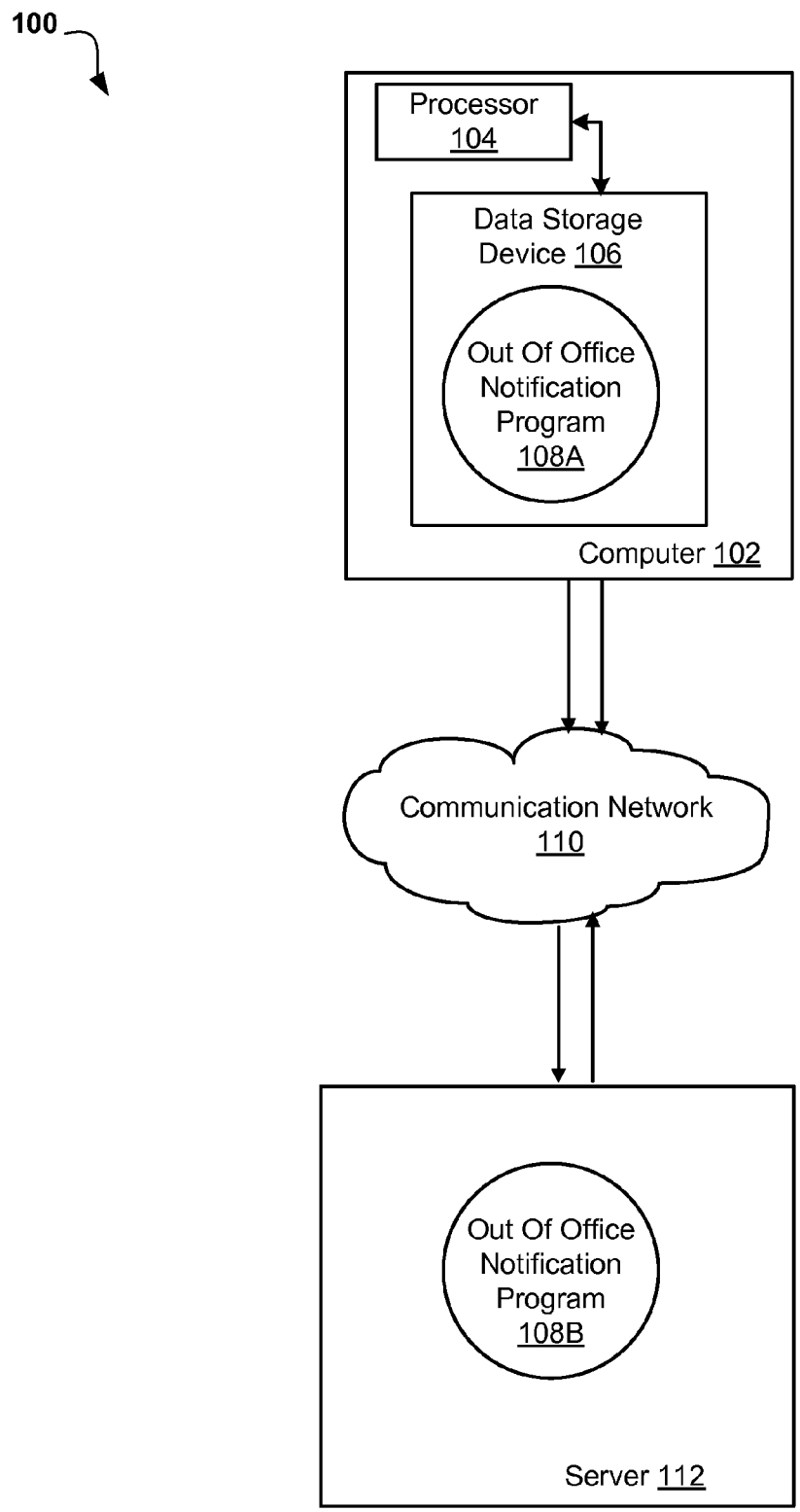
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to email clients. The following described exemplary embodiments provide a system, method and program product to, among other things, improve an existing out-of-office notification system that is a part of email clients.

As previously described, an out-of-office notification service may be used to send an automated reply to incoming messages while a user is away. As such, the automated reply may tell people who send a user mail while the user is away that the user is out and may additionally inform them as to when the user will be returning. Currently, various email clients may contain an out-of-office feature. Once a typical out-of-office notification is enabled by a user, all those who send mail to the user may receive a message stating that the user is out of the office and is returning on a specific date. However, existing out-of-office services may have limitations. For example, user X may send an email to user Y at time t=T1. However, Y does not respond back. Then, at the time t=T2>T1, Y may set an out-of-office notification and may not check his/her email for some period of time, such as one week. Furthermore, since X sent the email at T1<T2, X did not get an out-of-office notification. Additionally, X may not receive a response to X's email for one week since Y will be away and may not check his/her email for some period of time, such as one week. As such, it may be advantageous among other things to allow a user to define the time span or the duration of a "time window" before the instant that the time of the out-of-office notification is set. Therefore, all the emails received by the user in the time span before the user sets the out-of-office notification may be inspected, analyzed and short listed.

According to at least one embodiment, only the short listed senders of those emails in the inbox which arrived during the time duration and needed a response may receive a notification after the out-of-office duration period commences and not during the time instant when the out-of-office notification is created since the user may still have time to respond to the emails before the user departs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to allow users to improve an existing out-of-office notification system that is a part of email clients. According to at least one implementation, a user may be allowed to define the span or duration of a "time window" before the instant of time that the out-of-office notification is set. According to the present embodiment, the "time window" may be any duration of time. For example, the "time window" may be 1-2 days, or even a smaller duration, such as 5-6 hours. All of the emails received by the user in the time span before the out-of-office notification start date commences may be inspected and analyzed. During the analyzing, it may be determined that some of the emails could have been responded to by the user before the user departed and therefore, such identified emails may be skipped and an out-of-office notification may not be sent to the sender. Additionally, any emails of an informatory nature, which may not require a response, may also be skipped.

As such, according to at least one implementation, a shortlist may be created based on the inspecting and the analyzing of the emails received by the user in the time span before the user sets the out-of-office notification. Therefore, the shortlist may include only the senders of those emails in the inbox which arrived during the time duration specified in the "time window" and needed a response, but could not be responded to by the user before the out-of-office start date as set by the user commenced. Then, an out-of-office notification may be sent to only those sender names included in the shortlist. The out-of-office notification may be sent as soon as the state date of the out-of-office period commences and not during the time instant when the out-of-office notification was created since the user may still find some time to look at these emails and respond to them before the user departs.

Referring now to FIG. 1, an exemplary networked computer environment 100 in accordance with one embodiment is depicted. The networked computer environment 100 may include a computer 102 with a processor 104 and a data storage device 106 that is enabled to run an Out-Of-Office Notification Program 108A. The networked computer environment 100 may also include a server 112 that is enabled to run an Out-Of-Office Notification Program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as an Out-Of-Office Notification Program 108A and 108B may run on the client computer 102 or on the server computer 112. The Out-Of-Office Notification Program 108A, 108B may improve an existing out-of-office notification system that is a part of email clients. The Out-Of-Office Notification Program 108A, 108B may allow a user to define a time span or a duration of a "time window" before the instant that the start date of the out-of-office notification duration commences. Therefore, all the emails received by the user in this time span before the commencement of the start date of the out-of-office period may be inspected, analyzed and short listed. Then, according to at least one embodiment, only the short listed senders of those emails in the inbox which arrived during the time duration and needed a response may receive a notification after the out-of-office duration period commences and not during the time instant when the out-of-office notification is created. As such, the user may still have time to respond to the emails before the user departs. The Out-Of-Office Notification method is explained in further detail below with respect to FIG. 2.

Figure 2:
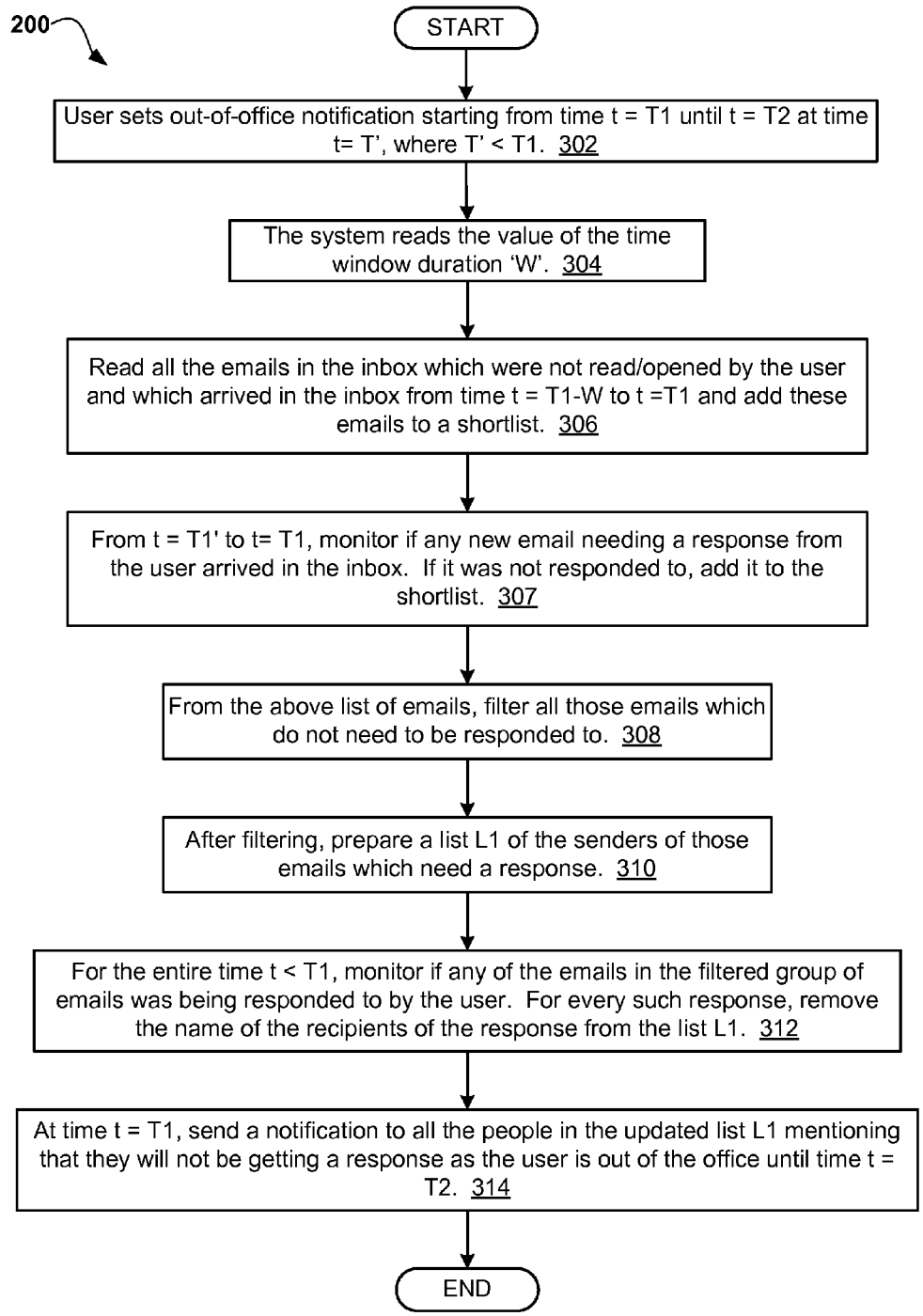
FIG. 2 is an operational flowchart illustrating the steps carried out by a program to improve an existing out-of-office notification system that is a part of email clients.

Referring now to FIG. 2, an operational flowchart 200 illustrating the steps carried out by a program to improve an existing out-of-office notification system that is a part of email clients in accordance with one embodiment is depicted. According to the present embodiment, the Out-Of-Office Notification Program 108A, 108B (FIG. 1) may select only those emails which could not be responded to by a user before the user set the out-of-office notification and add those selected emails to a list (i.e., a shortlist). Therefore, emails of an informal nature that do not require a response from the user, such as a server being down due to maintenance on a particular day, would not be added to this list.

Referring now to FIG. 2 at 302, a user may set the out-of-office notification starting from time t=T1 until t=T2 at time t=T', where T'<T1. For example, a user may be out-of-office from July $19^{th}$ to July $25^{th}$ and may wish to set the out-of-office notification on July $18^{th}$. As such, T1 would be July $19^{th}$; T2 would be July $25^{th}$, and T' would be July $18^{th}$.

Then at 304, the system reads the value of the time window duration 'W'. According to one implementation, the value of 'W' may be pre-determined and configured by the user earlier. As such, 'W' may be a time duration that may span for a certain amount of time, such as from 6 to 48 hours. According to one implementation, the time duration 'W' is configurable and pre-determined by the user.

Next, at 306, the method may read and analyze all the emails in the inbox which were not read or opened by the user and which arrived in the inbox from time t=T1−W to t=T1 and add these emails to a shortlist. As such, the method may read and analyze all the emails from T1 (July $19^{th}$)−W (48 hours), which begins for this example on July $17^{th}$ 00:00 hrs and continues until T1 (July $19^{th}$ 00:00 hrs).

Then at 307, from t=T1' to t=T1, the method may monitor if any new email needing a response from the user arrived in the inbox. If it was not responded to, then such an email may be added to the shortlist.

Next at 308, from the above list of emails, the method may filter all those emails which do not require a response at this time. For example, any email, such as an automated email concerning routine maintenance, may be filtered and removed.

Then at 310, after filtering, the method may prepare a list L1 of the senders of those emails which require a response. As such, a list of only those emails which may require a response may be delivered to the user.

Next at 312, for the entire time that t<T1, the method may monitor if any of the emails in the filtered group of emails was being responded to by the user. Then, for every such response, the method may remove the name of the recipients of the response from the list L1. For example, the method may continue filtering and removing emails during the duration prior to the user actually departing. For the above example, the method may continue filtering such emails until July $19^{th}$.

Then at 314, at the time t=T1, the method may send a notification to all the people in the updated list L1 mentioning that they will not be getting a response as the user is out of the of the office until time t=T2. For example, once the time is equal to the actual day that the user designated the out-of-office should begin (July $19^{th}$ with respect to the example above), the method may send a notification to all the people in the updated list L1 mentioning that they will not be getting a response as the user is out of the of the office until the time is equal to the actual day that the user is scheduled to return (July $25^{th}$ with respect to the example above).

It may be appreciated that FIG. 2 provides only an illustration of one implementation and does not imply any limitations with regard to how different embodiments may be implemented. Many modifications to the depicted environments may be made based on design and implementation requirements. As such, the previously described method may be implemented with a set of customary, pre-defined rules provided by the user so that the user may configure the emails the user may want to receive and respond to prior to the user's departure. The Out-Of-Office Notification Program 108A, 108B (FIG. 1) may notify those people who have sent an email in a pre-defined time span (i.e., a "time window") prior to the commencement of the start date of the out-of-office period. As such, the Out-Of-Office Notification Program 108A, 108B (FIG. 1) may analyze the emails that have not been responded to yet and filter generic emails so the out-of-office notification may be sent at the start of the out-of-office pre-determined time to handle emails which may be responded to later.

The following is an example scenario of when the Out-Of-Office Notification Program 108A, 108B (FIG. 1) may be utilized. A customer may send a user an email 2 days earlier to the user and the user was not able to respond to the email before the user went out of office. The customer may be waiting for the user's response as the customer is not aware of the user being out of office for the entire next week. Then at a particular time the next week (e.g., the next Wednesday or Thursday) the customer may send the user a gentle reminder asking to respond back to the customer. Then, at this moment, the current system may send the customer an out of office notification—"The user is on vacation for this entire week and thus cannot respond to your email". One implementation of the present embodiment is that the Out-Of-Office Notification Program 108A, 108B (FIG. 1) would ensure that such a message would be delivered to the senders of all the unresponded emails that arrived in the inbox in the duration of time specified by the "time window" before the start time, as soon as the out of office duration commences and avoid the customer from sending the reminder message after 3-4 days for the purpose of eliciting a response from the user.

Another example may be that the customer received the out of office notification the very first day the user went on vacation without waiting until a day the following week, such as next Wednesday or Thursday. Therefore, the customer may immediately contact the user's backup person and get the information the customer needs instead of waiting fruitlessly for 3-4 days and sending a reminder and then come to realize that the user was out of office for the entire week. Typically the higher a user is in the hierarchy, the more the number of unread mails that the user may have in their inbox. Furthermore, senior people may get copied on a lot of emails and they do not know which is important and which is to be ignored. The unresponded emails in the inbox of these people could be crucial and thus may benefit from the present embodiment.

It may be confusing if the same standard out-of-office message is sent to both the senders of the unresponded emails as well as the senders of the new emails (for those emails which arrived in the inbox after the start date of the out of office period commences). According to the present embodiment, the system may send two different types of out-of-office notifications which are described below:

1) The normal out-of-office notification (as seen today in existing state of the art systems)—This message is sent to all those users whose emails arrived in our inbox AFTER the start date of the out of office period commences. An example for such a notification message would be:

"Nithin Shenoy is on vacation from 19 Jul. 2014 to 25 Jul. 2014 and thus cannot respond to your email. Please contact User Y (backup person)".

2) The special or improved out-of-office notification (as per the present embodiment)—This notification message is sent to the senders of all those unresponded emails in our inbox which arrived in the time window (based on the configurable parameter previously described) before the start date of the out of office duration commences. The user may be provided an option to tailor this message as per the user's preference. The following is one such example of how this improved notification would look like:

"Hello User X! (User X is the sender of the unresponded email) You had sent an email to Nithin Shenoy (the recipient of the unresponded email) on 14 Jul. 2014 with the subject "Urgent help needed on defect #12134" which has not been responded to as of date. As Nithin Shenoy is on vacation from 19 Jul. to 25 Jul. 2014, you may not get a response for this email until then. Please contact User Y (backup person for Nithin Shenoy)".

Assuming that Nithin Shenoy set his out-of-office notification on 18th July at 6 PM in the evening and has gone on vacation, the above notification would be sent to User X on 19th July 00:00 hrs, assuming that Nithin Shenoy did not get a chance to respond back to the user before 19th July 00:00 hrs. This would prompt User X to contact Nithin's backup (User Y) for the desired information instead of unnecessarily waiting for Nithin to respond to his email.

Figure 3:
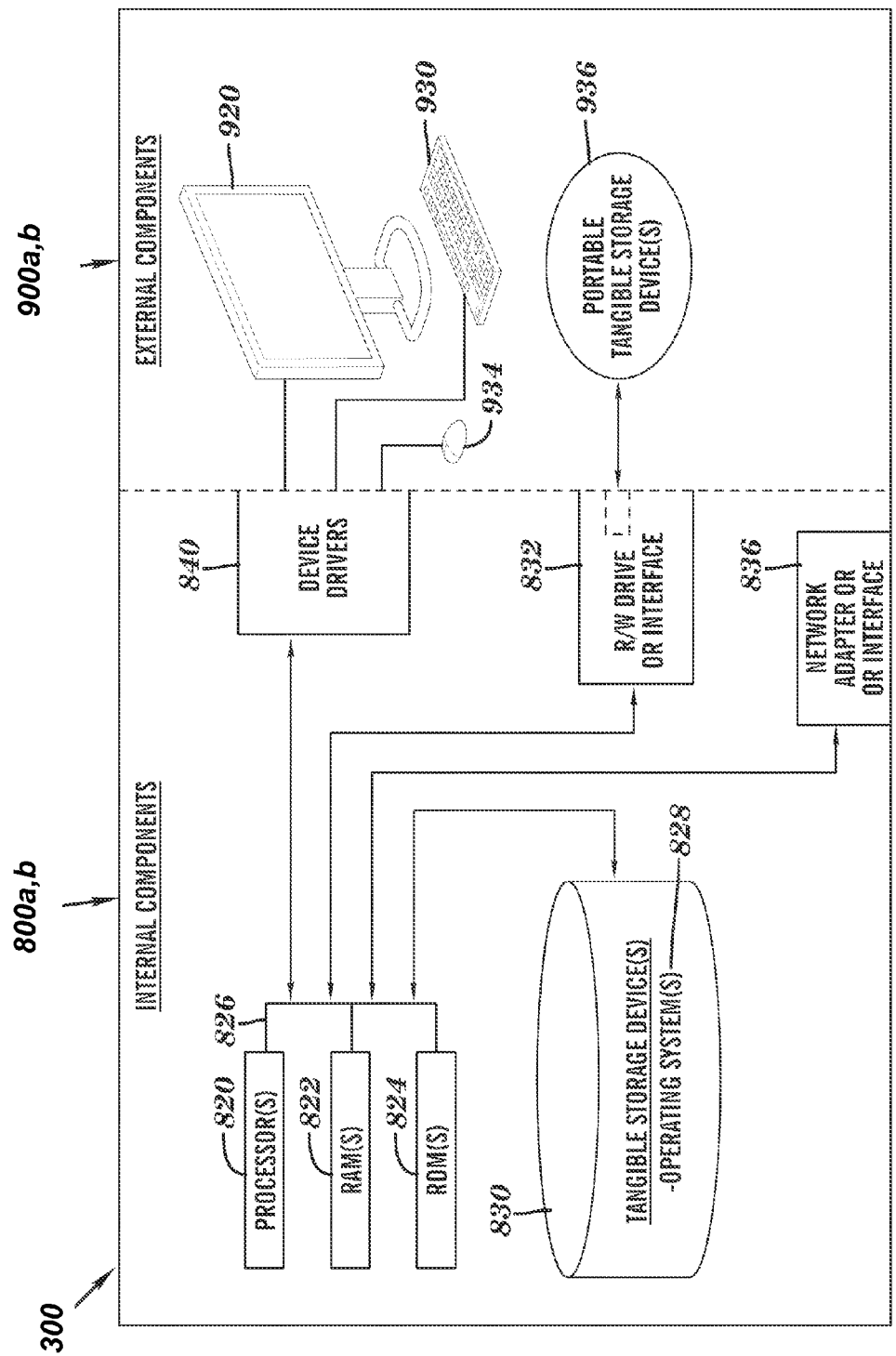
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800a, b and external components 900a, b illustrated in FIG. 3. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and Out-Of-Office Notification Program 108A (FIG. 1) in client computer 102 (FIG. 1) and Out-Of-Office Notification Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as Out-Of-Office Notification Program 108A (FIG. 1) and 108B (FIG. 1), can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The Out-Of-Office Notification Program 108A (FIG. 1) in client computer 102 (FIG. 1) and Out-Of-Office Notification Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the Out-Of-Office Notification Program 108A (FIG. 1) in client computer 102 (FIG. 1) and the Out-Of-Office Notification Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method for an online out-of-office message notification system to notify at least one sender who has sent an email in a pre-defined time span prior to a start time associated with an online out-of-office notification being set by a user and to notify at least one other sender who has sent an email in a predefined time span following the start time associated with the online out-of-office notification being set by the user, the method comprising:
   in response to the online out-of-office notification being set by the user, monitoring a plurality of emails associated with the user;
   detecting a plurality of emails being received within the monitored plurality of emails;
   analyzing the detected received plurality of emails;
   identifying a first plurality of un-responded emails within the analyzed received plurality of un-responded emails, wherein the identified first plurality of un-responded emails is in an inbox and was received within the pre-defined time span prior to the start time associated with the out-of-office notification being set by the user and wherein the identified first plurality of un-responded emails was determined to require a first response;
   identifying a second plurality of un-responded emails within the analyzed received plurality of emails, wherein the identified second plurality of un-responded emails is in the inbox and was received within the pre-defined time span following the start time associated with the out-of-office notification being set by the user, and wherein the identified second plurality of un-responded emails was determined to require a second response;
   sending a first out-of-office message notification to the at least one sender associated with at least one un-responded email within the identified first plurality of un-responded emails; and
   sending a second out-of-office message notification to the at least one other sender associated with at least one un-responded email within the identified second plurality of un-responded emails.

2. The method of claim 1, further comprising:
- filtering a plurality of generic emails from the monitored plurality of un-responded emails in the inbox; and
- creating a list of a plurality of senders associated with a plurality of emails which require a response from the monitored plurality of un-responded emails in the inbox.

3. The method of claim 2, wherein the filtering the plurality of generic emails from the analyzed plurality of un-responded emails in the inbox comprises monitoring if an email within the plurality of un-responded emails in the inbox has been responded to by the user.

4. The method of claim 2, wherein the filtering the plurality of generic emails from the analyzed plurality of un-responded emails in the inbox comprises removing a name associated with a recipient of the email in the inbox that has been responded to by the user.

5. The method of claim 2, wherein the filtering the plurality of generic emails from the analyzed plurality of un-responded emails in the inbox comprises using a set of pre-defined rules created by the user.

6. The method of claim 1, wherein the pre-defined time span comprises determining a current time;
- setting a start time associated with the out-of-office notification;
- setting an end time associated with the out-of-office notification; and
- determining a pre-determined time window wherein the pre-determined time window begins at time that is less than the start time.

7. The method of claim 6, wherein the pre-determined time window comprises a time duration that is configurable by the user.

8. The method of claim 6, wherein the monitoring and the analyzing of the plurality of un-responded emails occurs for a duration from the set start time minus the pre-determined time window until the set start time and comprises adding the plurality of un-responded emails in the inbox to a shortlist.

* * * * *